United States Patent Office 3,845,098
Patented Oct. 29, 1974

3,845,098
CONSTRAINED AMINE CATALYSTS IN THE
PRODUCTION OF URETHANES
Stephen N. Massie, Palatine, and Paul A. Pinke, Des Plaines, Ill., assignors to Universal Oil Products Company, Des Plaines, Ill.
No Drawing. Filed Mar. 9, 1973, Ser. No. 339,819
Int. Cl. C07c 125/06
U.S. Cl. 260—471 C                      6 Claims

ABSTRACT OF THE DISCLOSURE

Constrained amine catalysts are utilized in the formation of urethanes from the reaction of isocyanates and alcohols.

---

This invention relates to the utilization of certain catalytic compositions of matter in a process for preparing a urethane by a reaction of an isocyanate with an alcohol. More specifically, this invention relates to the use of a constrained amine catalyst in a process for preparing a polyurethane by a reaction of a polyisocyanate with a polyol.

It has been shown in the formation of urethanes from the reaction of an isocyanate with an alcohol that an amine such as diazabicyclo[2.2.2]octane has been utilized to catalyze the reaction.

In contradistinction to the prior art, it has now been discovered that 4,4'-bis-(N-prollidyl)diphenylmethane or 4,4'-bis-(N-piperidyl)diphenylmethane may be utilized in the formation of urethanes or polyurethanes from the reaction of an alcohol and an isocyanate or a polyol and a polyisocyanate to further enhance the speed and the percent conversion to the urethane or the polyurethane. The utilization of the catalyst of the present invention will allow the manufacturer of urethane or polyurethane to reduce his cost of the final product as a result of the decrease in cost of preparation of this novel catalyst while augmenting the percentage conversion of the initial reactants, the polyol and the polyisocyanate, to the polyurethane or the alcohol and the isocyanate to the urethane.

Urethanes are utilized in the chemical industry in many ways. For example, a urethane can be used as an intermediate or solvent for pharmaceuticals, in medicine, in pesticides, in fungicides, in biochemical research; whereas polyurethanes can be used in cushions, insulators, structural components, decorator panels, furniture, coatings, etc.

It is therefore an object of this invention to provide a catalyst for improvement of a process for the preparation of urethanes and polyurethanes.

A further object of this invention is to provide a process for the preparation of urethanes or polyurethanes utilizing certain catalytic compositions of matter which will permit a faster reaction and a greater percentage conversion while the recovery of the desired urethane or polyurethane may be completed in a more expedient manner.

In one aspect an embodiment of this invention resides in a process for the preparation of a urethane (which hereafter shall include polyurethanes) which comprises the reaction of an isocyanate with an alcohol at reaction conditions and recovering the resultant urethane, the improvement in said process consisting of the utilization of 4,4'-bis-(N-pyrollidyl)diphenylmethane or 4,4'-bis-(N-piperidyl)diphenylmethane as a catalyst for the reaction.

A specific embodiment of this invention resides in a process for preparing N-phenyl methyl urethane which comprises the reaction of methanol and phenyl isocyanate in the presence of 4,4'-bis-(N-pyrollidyl)diphenylmethane at a temperature in the range of about 50° C. to about 200° C. and a pressure in the range of from about atmospheric to about 5 atmospheres and recovering the resultant N-phenyl methyl urethane.

Another specific embodiment of this invention resides in a process for preparing N-phenyl phenyl urethane which comprises the reaction of N-phenyl isocyanate and phenol in the presence of 4,4'-bis-(N-piperidyl)diphenylmethane at a temperature of 150° C. and at a pressure of 5 atmospheres and recovering the resultant N-phenyl phenyl urethane.

Yet another specific embodiment of this invention resides in a process for preparing a polyurethane which comprises the reaction of 2,4-toluene diisocyanate and ethylene glycol in the presence of 4,4'-bis-(N-piperidyl) diphenylmethane or 4,4' - bis-(N-pyrollidyl)diphenylmethane at a temperature of 40° C. and a pressure of 1.5 atmospheres and recovering the resultant polyurethane.

Other objects and embodiments will be found in the following further detailed description of the present invention.

As hereinbefore set forth the present invention is concerned with a process for preparing urethanes, said process being effected by reacting an alcohol with an isocyanate in the presence of certain novel catalytic compositions of matter. For the purposes of this invention the term "urethane" and "isocyanate" in the specification and appended claims means monomers and polymers of urethane and isocyanate as well as polyisocyanates. The reaction is effected under reaction conditions which include a temperature in the range of from about 0° C. to about 200° C. and preferably in the range of from about 10° C. to about 100° C. In addition, another reaction condition involves pressure, said pressure ranging from about atmospheric up to about 100 atmospheres and preferably within the range of from about atmospheric to about 10 atmospheres. When superatmospheric pressures are employed, said pressure is afforded by the introduction of a substantially inert gas such as nitrogen into the reaction zone, the particular pressure which is used being that which is necessary to maintain a major portion of the reactants in the liquid phase.

Examples of suitable isocyanates which are utilized as one of the starting materials in the process of the invention include isocyanate, N-methyl isocyanate, N-ethyl isocyanate, N-propyl isocyanate, N-amyl isocyanate, N-hexyl isocyanate, N-nonyl isocyanate, N-decyl isocyanate, N-phenyl isocyanate, N-tolyl isocyanate, N-3-o-xylyl isocyanate, N-o-cumyl isocyanate, N-2-methoxybenzene isocyanate, N-2-ethoxybenzene isocyanate, N-3-benzoic acid isocyanate, N-decene-2 isocyanate, N-naphthyl isocyanate, N-pentene-1 isocyanate, 2,4-toluene diisocyanate, ethylene diisocyanate, N-heptene-2 isocyanate, 1,6-hexylene diisocyanate, etc.

Suitable alcohol compounds which may be reacted with the aforementioned isocyanates will include either mono- or polyhydroxy alcohols. Monohydric alcohols, both saturated and unsaturated, are exemplified by methyl alcohol, ethyl alcohol, n-propyl alcohol, isopropyl alcohol, n-butyl alcohol, isobutyl alcohol, n-pentyl alcohol, n-heptyl alcohol, n-hexyl alcohol, n-octyl alcohol, n-nonyl alcohol, n-decyl alcohol, lauryl acohol, myristyl alcohol, cetyl alcohol, stearyl alcohol, sec-butyl alcohol, sec-amyl alcohol, sec-heptyl alcohol, sec-hexyl alcohol, sec-octyl alcohol, sec-nonyl alcohol, sec-decyl alcohol, t-butyl alcohol, t-amyl alcohol, t-heptyl alcohol, t-hexyl alcohol, t-octyl alcohol, t-nonyl alcohol, t-decyl alcohol, allyl alcohol, crotyl alcohol, 2-methypentene-2-ol-4, cyclobutanol, cyclopropanol, cyclohexanol, cycloheptanol, cyclooctanol, cyclononanol, cyclodecanol, phenol, 2-methylphenol, 2-propylphenol, 2,3-xylenol, 2,4-xylenol, 2,5-xylenol, benzyl alcohol, naphthanol or the polyhydroxy saturated and unsaturated alcohols such as 1,2-ethanediol (ethylene glycol) 1,2-propanediol, 1,3-propanediol, 1,4-butanediol, 1,3-butanediol, 1,3-pentanediol, 1,5-pentanediol, 1,6-hexanediol, 1,2-hexanediol, 1,3-hexanediol, 1,5-heptanediol, 1,7-heptanediol, 1,8-octanediol, 2,4-octanediol, 1,9-nonanediol, 4,5-nonanediol, 4,7-decanediol, 1,10 - decanediol, 1,3-pentene-4-diol, 1,4-hexene-2-diol, 1,7-heptene-2-diol, 1,4-butene-2-diol, 1,5-pentene-2-diol, 3-ethoxy-2,4-hexanediol, 5-ethoxy-1,6-decanediol, glycerine, pentaerylthritol and other homologs of the polyhydroxy alkanes, ethoxylated polyhydroxyalkanes, etc. It is to be understood that the aforementioned isocyanates and mono- and polyalcohols are only representative of the class of compounds which may be employed and that the present invention is not necessarily limited thereto.

The novel catalytic composition of matter which is utilized in the process of this invention comprises two saturated heterocyclic nitrogen groups where the nitrogens are attached to phenyl groups which are part of a diarylalkane. More specifically, the compounds which are contemplated within the scope of this invention are 4,4'-bis-(N-pyrollidyl)diphenylmethane and 4,4'-bis-(N-piperidyl)diphenylmethane.

The process of this invention may be effected in any suitable manner and may comprise either a batch or continuous type operation. For example, when a batch type operation is employed, the reactants comprising the alcohol and the isocyanate are placed in an appropriate apparatus along with the catalyst, either 4,4'-bis-(N-pyrollidyl)diphenylmethane or 4,4'-bis-(N-piperidyl)diphenylmethane. If atmospheric pressure is to be employed, the reaction vessel is then heated to a predetermined operation temperature. After maintaining the reactants in the reaction vessel at this temperature for a reaction time which may range from 0.5 up to about 20 hours or more in duration, heating is discontinued and the vessel it allowed to return to room temperature. The urethane or polyurethane is then recovered, separated from the 4,4'-bis-(N-pyrollidyl)diphenylmethane or the 4,4'-bis-(N-piperidyl)diphenylmethane and subjected to conventional means of purification and separation, if necessary, said means including washing, drying, extraction, fractional distillation, etc. whereby the desired urethane or polyurethane is recovered. Alternatively, if superatmospheric pressures are to be employed in the reaction, the reactants are charged to a pressure vessel such as a rotating or stirred autoclave which contains a catalyst comprising either 4,4'-bis-(N-pyrollidyl)diphenylmethane or 4,4'-bis-(N-piperidyl)diphenylmethane. The autoclave is sealed and a substantially inert gas such as nitrogen, helium or argon is pressured in until the desired operating pressure is reached. The autoclave is then heated to the desired operating temperature and maintained thereat for a predetermined residence time. At the end of this time, heating is discontinued, the autoclave is allowed to return to room temperature and the excess pressure is discharged. The autoclave is opened and the reaction mixture is then treated in a manner similar to that hereinbefore set forth whereby the desired urethane or polyurethane is separated and recovered.

It is also contemplated within the scope of this invention that the reaction process for obtaining a urethane or polyurethane may be effected in a continuous manner of operation. When such a type of operation is employed, the reactants are continuously charged to the reaction vessel containing either the 4,4'-bis-(N-pyrollidyl)diphenylmethane or 4,4'-bis-(N-piperidyl)diphenylmethane catalyst, said vessel being maintained at the proper operating conditions of temperature and pressure. After completion of the desired residence time, the reactor effluent is continuously withdrawn and subjected to conventional means of separation whereby the desired urethane or polyurethane is recovered, while any unreacted materials comprising the alcohol or polyol, or isocyanate or polyisocyanate, or any recovered catalytic material comprising either 4,4'-bis-(N-pyrollidyl)diphenylmethane or 4,4'-bis-(N-piperidyl)diphenylmethane are recycled to the reaction zone to form a portion of the feed stock. Inasmuch as the catalyst is quite soluble in various media, it can be carried to the reaction zone dissolved in the alcohol or polyol.

Examples of urethanes or polyurethanes which may be prepared according to the process of this invention will include N-methyl methyl urethane, phenyl urethane, N-methyl phenyl urethane, N-ethyl phenyl urethane, N-phenyl phenyl urethane, N-(p-methoxybenzene)-p-tolyl urethane, N-naphthyl phenyl urethane, N-(p-chlorophenyl)-1,4-dichlorophenyl urethane, rigid foamed polyurethane; flexible foamed polyurethanes, etc.

The following examples are given to illustrate the process of the present invention which, however, are not intended to limit the generally broad scope of the present invention in strict accordance therewith.

EXAMPLE I

In this example 119 grams of phenyl isocyanate and 32 grams of methanol are added to a clean, dry autoclave. The autoclave is sealed and heated with rotation to 50° C. while remaining at atmospheric pressure for a period of time of about 4 hours, at which time heating is terminated and the autoclave is allowed to return to room temperature. The contents of the autoclave are analyzed by means of gas chromatography instrumentation and found to contain a low percent N-phenyl methyl urethane (methyl N-phenylcarbamate).

EXAMPLE II

In this experiment all physical conditions are maintained at the constant value of Example I except that 0.1 gram of 4,4'-bis-(N-pyrollidyl)diphenylmethane is added to the autoclave containing the methanol and the phenyl isocyanate. After a period of 4 hours, the contents of the autoclave are separated from the catalyst, 4,4'-bis-(N-pyrollidyl)diphenylmethane and analyzed by means of gas chromatography instrumentation, said analysis indicates the contents to be a high percentage yield of N-phenyl methyl urethane (methyl N-phenylcarbamate).

EXAMPLE III

In this experiment 119 grams of phenyl isocyanate and 94 grams of phenol are added to a rotating autoclave equipped with heating and pressure devices. The autoclave is heated to 50° C. while being maintained at 2 atmospheres under a blanket of inert nitrogen for a period of time of 3 hours. The heating is terminated, the autoclave allowed to return to room temperature and ambient pressure and the contents analyzed by means of gas chromatography instrumentation, said analysis discloses a low percentage yield of N-phenyl phenyl urethane (phenyl N-phenylcarbamate).

EXAMPLE IV

In this experiment a duplicate autoclave containing 119 grams of phenyl isocyanate and 94 grams of phenol is utilized along with 0.1 gram of 4,4'-bis(N-piperidyl)diphenylmethane. The autoclave is heated to a temperature of 50° C. while the pressure is maintained at 2 atmospheres by a forced pressure of substantially inert nitrogen for a period of .5 hours. At this point, the autoclave is allowed to return to room temperature and ambient pressure, at which time the contents are separated from the 4,4'-bis(N-piperidyl)diphenylmethane and the remaining contents are analyzed by means of gas chromatography instrumentation, said analysis discloses a high yield of N-phenyl phenyl urethane (phenyl N-phenyl carbamate).

EXAMPLE V

In this experiment 174 grams of 2,4-toluene diisocyanate and 62 grams of ethylene glycol are added to a rotating autoclave equipped with heating and pressure devices along with 0.25 grams of 4,4'-bis-(N-pyrollidyl)diphenylmethane. The autoclave is rotated at a temperature of 35° C. and under ambient pressure for 6 hours after which the contents are found to have reacted to form a solid polymeric substance. Repeating the experiment in the absence of the constrained amine, 4,4'-bis-(N-pyrollidyl)diphenylmethane, results in viscous, but mobile liquid, indicating a much lower degree of urethane polymer formation.

EXAMPLE VI

In this experiment 72 grams of ethyl isocyanate and 60 grams of ethylene glycol are added to a rotating autoclave equipped with heating and pressure devices along with .25 grams of 4,4'-bis-(N-piperidyl)diphenylmethane. The autoclave is rotated at a temperature of 50° C. at ambient pressure for 7 hours, after which the contents are found to have reacted to form a solid polymeric substance. Repeating the experiment in the absence of the constrained amine, 4,4'-bis(N-piperidyl)diphenylmethane, results in a viscous, but mobile liquid, indicating a much lower degree of urethane polymer formation.

We claim as our invention:

1. In a method for the reaction of an isocyanate with an alcohol at reaction conditions, the improvement which consists in the utilization of 4,4'-bis(N-pyrollidyl)diphenylmethane or 4,4'-bis-(N-piperidyl)diphenylmethane as a catalyst for the reaction.

2. The process of Claim 1 further characterized in that the reaction conditions include a temperature in the range of from about 0° C. to about 150° C. and a pressure in the range of atmospheric to 100 atmospheres.

3. The process of Claim 1 further characterized in that the isocyanate is phenyl isocyanate, the alcohol is methanol, the resultant reaction product is N-phenyl methyl urethane and the catalyst utilized is 4,4'-bis-(N-pyrrolidyl)diphenylmethane.

4. The process of Claim 1 further characterized in that the isocyanate is N-phenyl isocyanate, the alcohol is phenol, the resultant reaction product is N-phenyl phenyl urethane and the catalyst utilized is 4,4'-bis-(N-piperidyl)diphenylmethane.

5. The process of Claim 1 further characterized in that the isocyanate is 2,4-toluene diisocyanate, 2,6-toluene diisocyanate or a mixture thereof, the alcohol is ethylene glycol, and the catalyst utilized is 4,4'-bis-(N-pyrollidyl)diphenylmethane.

6. The process of Claim 1 further characterized in that the isocyanate is ethyl isocyanate, the alcohol is ethylene glycol, the resultant reaction product is N,N-diethyl ethylene urethane and the catalyst utilized is 4,4'-bis-(N-piperidyl)diphenylmethane.

References Cited
UNITED STATES PATENTS 3,719,702  3/1973  Traber et al. _____ 260—471 C LORRAINE A. WEINBERGER, Primary Examiner L. A. THAXTON, Assistant Examiner U.S. Cl. X.R.

260—2.5 AC, 479 C, 482 B, 482 C